United States Patent [19]
Tran

[11] Patent Number: 5,964,213
[45] Date of Patent: Oct. 12, 1999

[54] BURNER FOR GAS COOKING UNITS

[76] Inventor: Viet Hung Tran, 9193 - 162nd Street, Surrey, British Columbia, Canada, V4N 3C4

[21] Appl. No.: 09/008,089

[22] Filed: Jan. 16, 1998

[51] Int. Cl.[6] ....................................................... F24C 3/00
[52] U.S. Cl. ..................... 126/39 R; 126/39 K; 431/354; 239/554
[58] Field of Search ............................... 126/36 R, 41 R, 126/38, 25 R, 39 E, 51; 431/354, 350; 99/446, 447; 239/554, 568, 555, 600, 548

[56] References Cited

U.S. PATENT DOCUMENTS

| | | | |
|---|---|---|---|
| 3,574,505 | 4/1971 | Kimball | 431/354 |
| 3,688,758 | 9/1972 | Stephen, Jr. | 126/41 R |
| 3,825,404 | 7/1974 | De Gouville | 431/354 |
| 5,405,263 | 4/1995 | Gerdes et al. | 431/354 |
| 5,649,477 | 7/1997 | Lingwood | 99/446 |

*Primary Examiner*—James C. Yeung
*Attorney, Agent, or Firm*—Norman M. Cameron

[57] ABSTRACT

A burner unit for a gas cooking unit includes an upwardly concave, disk-shaped member. There is a manifold below the disk-shaped member which has a top with a circular opening. The manifold is connected to the disk-shaped member within the opening. There is a circular gap extending about the disk-shaped member between the member and the manifold. The manifold has a gas connection located radially outwards from the disk-shaped member. There is an opening for air adjacent the connection. Air mixes with gas entering the manifold through the connection and an air/gas mixture passes through the gap between the manifold and the disk-shaped member.

9 Claims, 6 Drawing Sheets

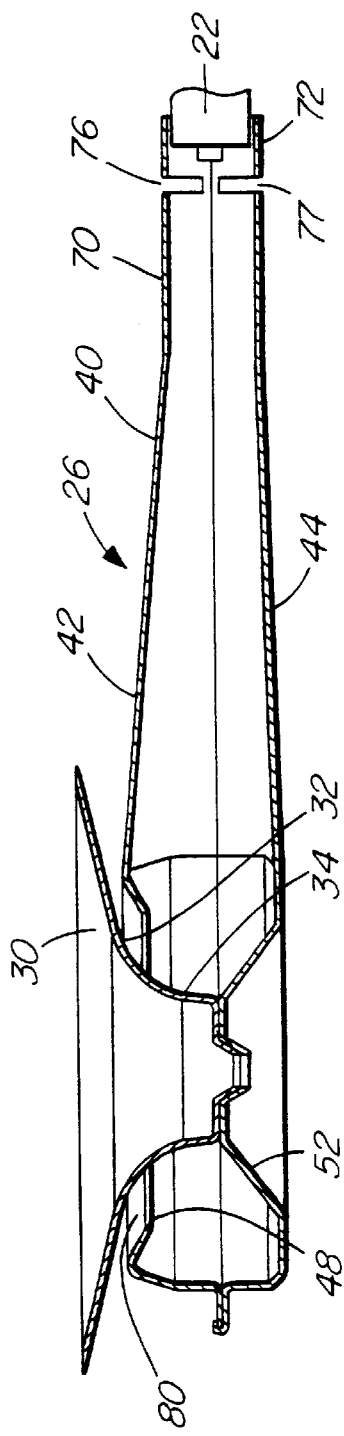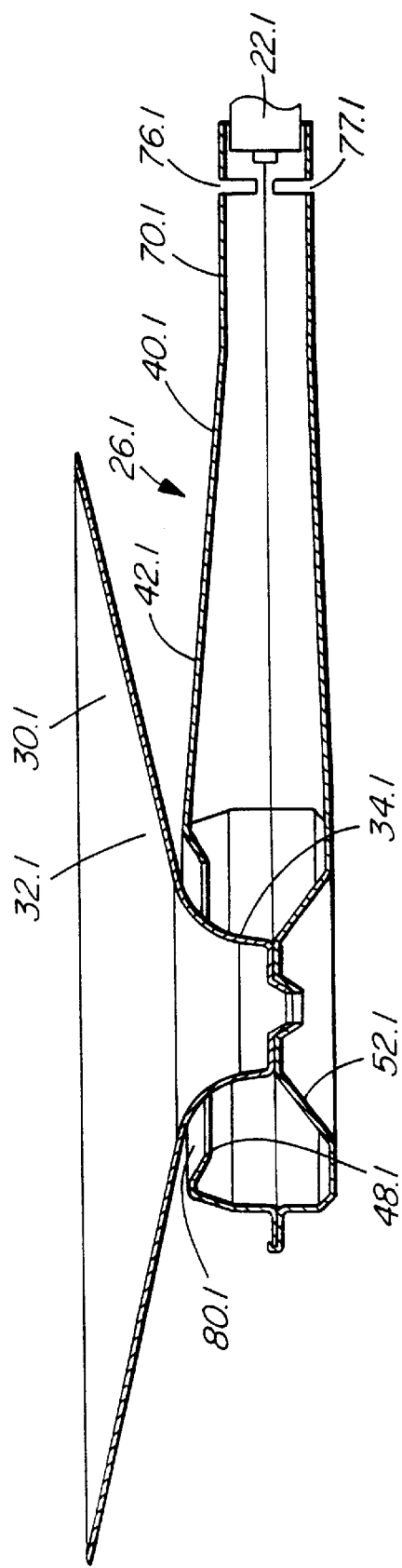
FIG. 2
FIG. 2a 5,964,213

1

BURNER FOR GAS COOKING UNITS

BACKGROUND OF THE INVENTION

This invention relates to burners for gas cooking units and, in particular, to circular burners for combination barbecues and stoves or combination smokers and grills.

Circular cooking units, such as barbecues or smokers, are well known. For example, one type of common barbecue includes a clam shell-like hollow body mounted on a stand. There is a disk-like burner unit below the grill thereof. The air typically mixes with gas about the disk-like member. However the quality of flame is often far from perfect. Ideally gas flames should be blue which indicates complete combustion. Orange flames, indicating incomplete combustion, are far too common with some such units. In addition, fat and juices from the foods fall into the center of the burner and cannot easily drain away. This can cause flare ups and excessive smoking.

Accordingly, there is a need for an improved burner unit which would provide better combustion, preferably yielding a desirable blue gas flame, and, and the same time, allow for proper drainage of fats and other fluids from the food being cooked.

SUMMARY OF THE INVENTION

According to the invention, there is provided a burner unit for a gas cooking apparatus, the unit comprises an upwardly concave, disk-shaped member having a bottom. There is a manifold having a top with a circular opening. The disk-shaped member is connected to the manifold within the opening. A circular gap extends about the disk-shaped member between the member and the manifold. The manifold has a gas connection located radially outwards from the disk-shaped member. There is an opening for air adjacent to the connection. Air mixes with gas entering the manifold through the connection. An air/gas mixture passes through the gap between the manifold and the disk-shaped member.

Burner units according to the invention offer significant advantages compared to the prior art. There is an even clear, blue flame about the burner unit, indicating optimum combustion. In addition, there may be a drainage passageway through the center of the disk-shaped member to allow drainage of fat and other fluids from the food being cooked.

BRIEF DESCRIPTION OF THE DRAWINGS

In the drawings:

FIG. 2 is sectional view of a burner unit for the combination barbecue and stove of FIG. 1 with a disk-shaped member adapted for wok cooking;

FIG. 2a is a sectional view of a unit similar to that of FIG. 2 with a larger disk-shaped member for barbecuing;

FIG. 4d is a sectional view taken along line 4d—4d of FIG. 4a;

2

Figure 5A:
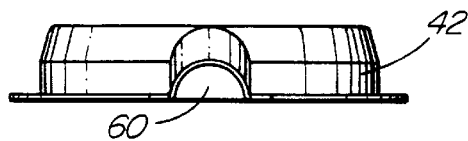
FIG. 5a is an end of view of the top half of the manifold.
Figure 5B:
FIG. 5b is a sectional view taken along line 5b—5b of FIG. 5d.
Figure 5C:
Figure 5D:
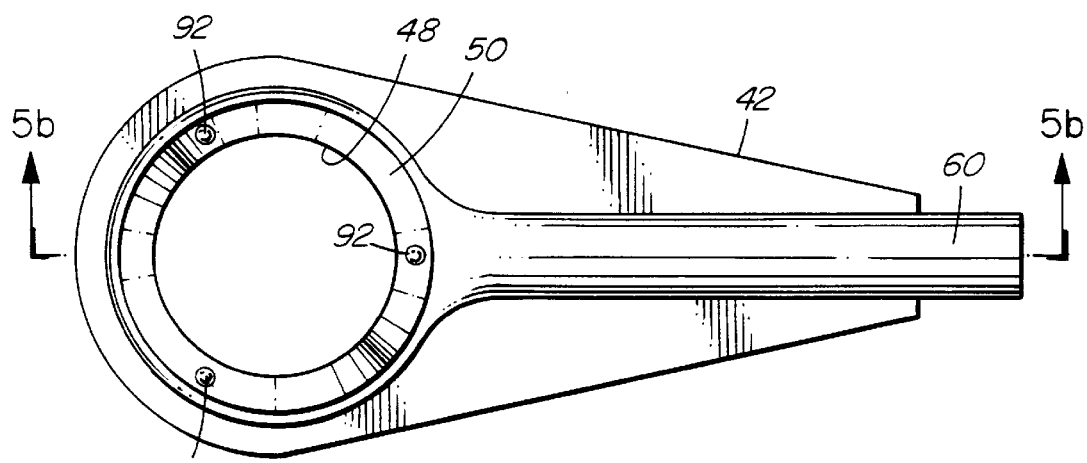

FIG. 5c is a side elevation thereof;

FIG. 5d is a top plan view thereof; and

Figure 6:
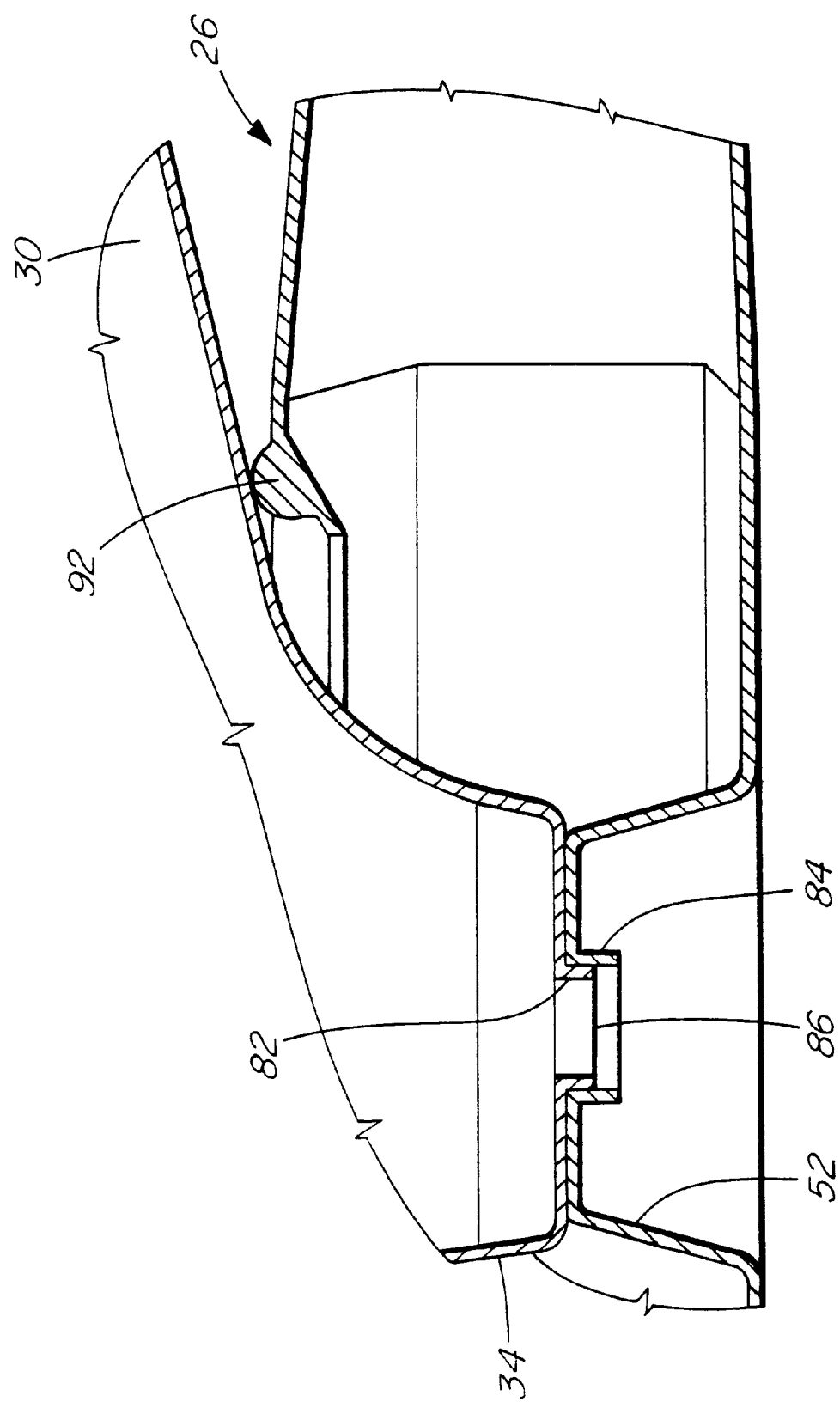

FIG. 6 is an enlarged fragmentary view of the embodiment of FIG. 2.

DETAILED DESCRIPTION OF THE PREFERRED EMBODIMENTS

Figure 1:
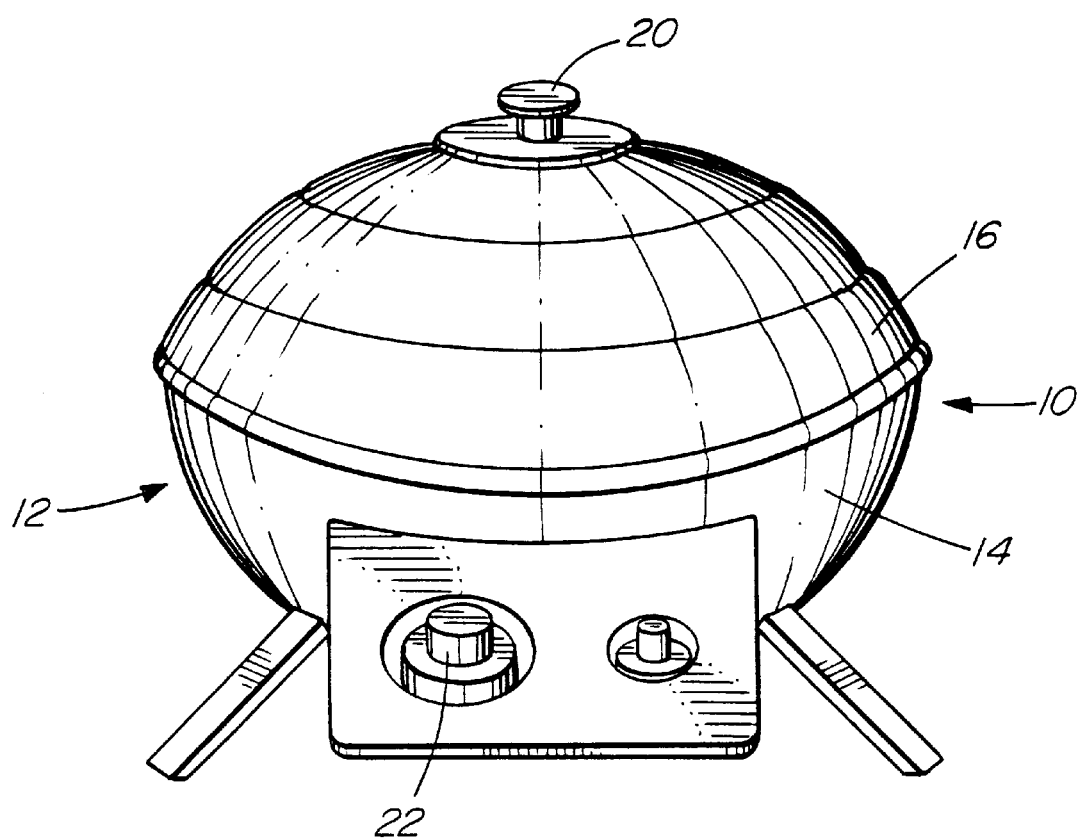
FIG. 1 is a front elevation of a combination barbecue and stove according to an embodiment of the invention.
Figure 3:
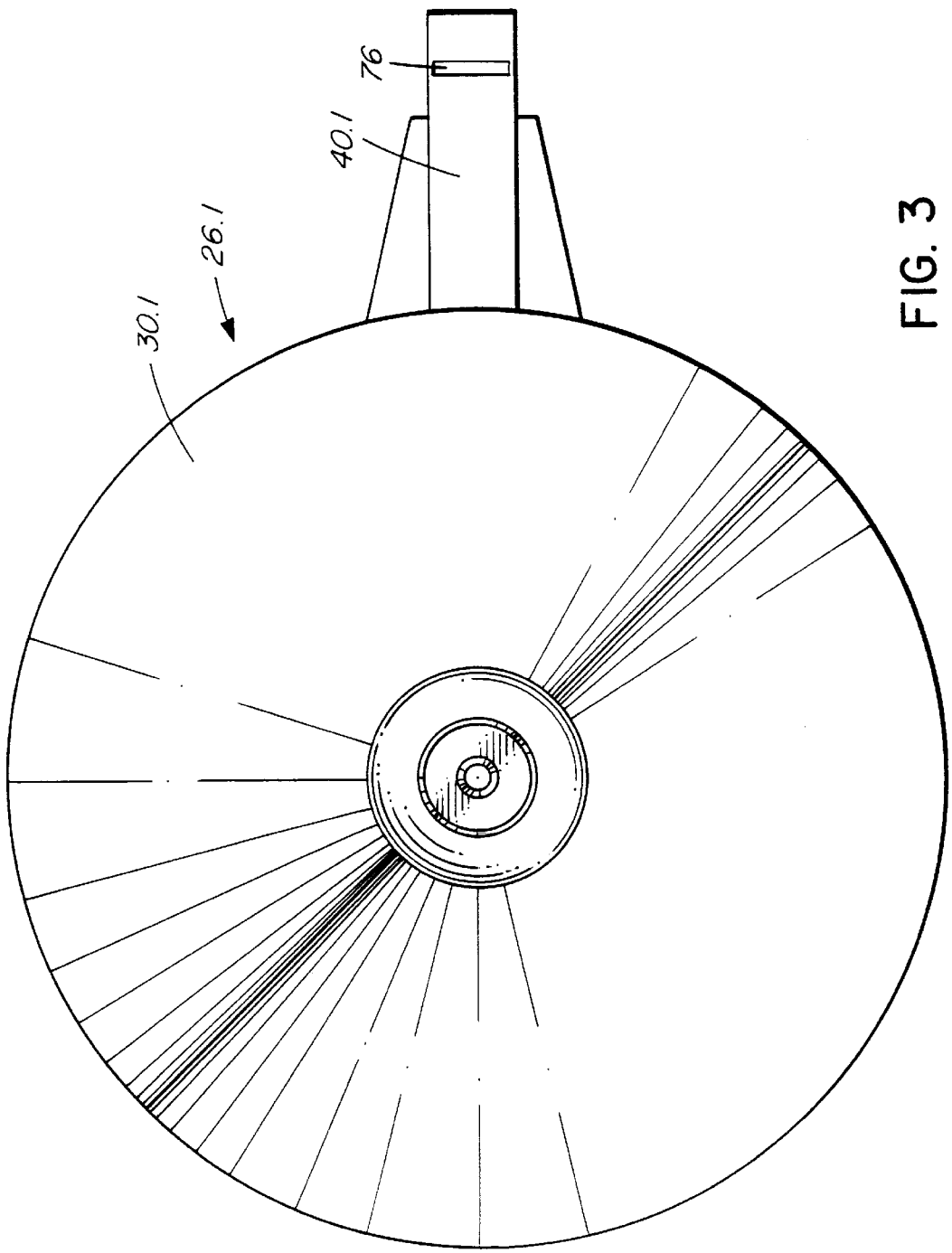
FIG. 3 is a top plan view thereof.
Figure 4A:
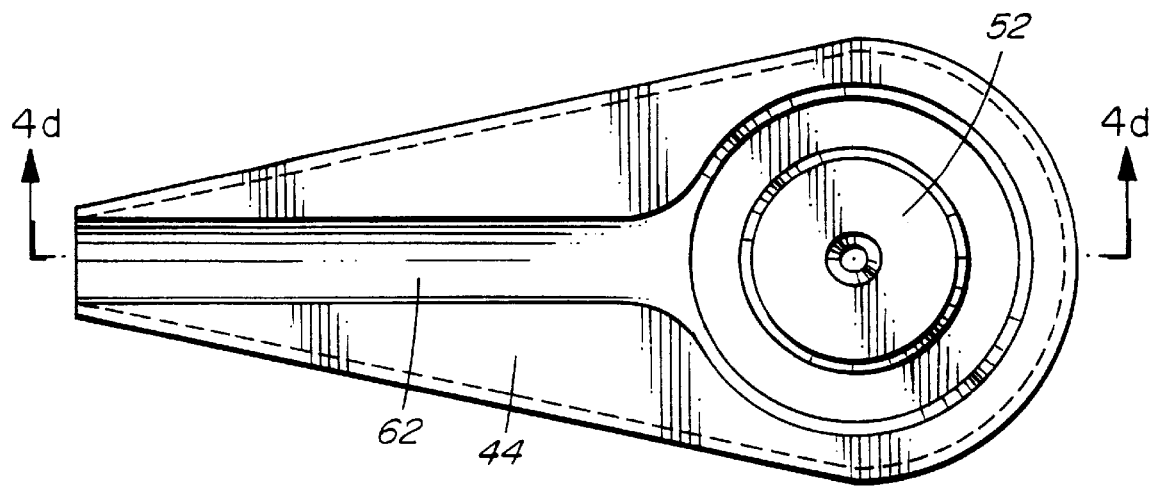
FIG. 4a is a top plan view of the bottom half of the manifold thereof.
Figure 4B:
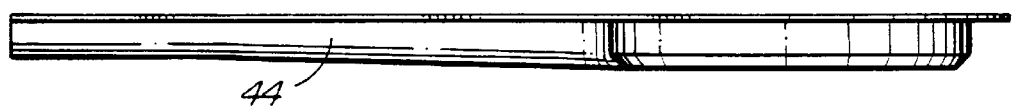
FIG. 4b is a side elevation thereof.
Figure 4C:
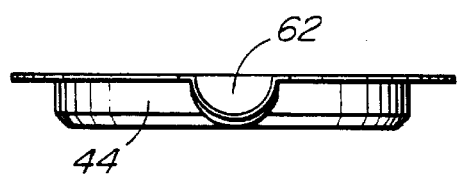
FIG. 4c is an end view thereof.
Figure 4D:
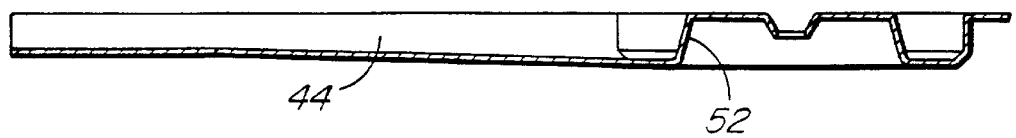

Referring to the drawings and first to FIG. 1, this shows a combination barbecue and stove 10 according to an embodiment of the invention. However it should be understood that the invention is also applicable to other types of gas cooking and smoking units besides the clam shell-like unit in FIG. 1. The barbecue and stove 10 has a conventional housing 12 including a bowl-like bottom half 14 and a lid 16 shaped like an inverted bowl and connected to the bottom by hinge units (not shown). There is a handle 20 attached to the lid. A gas regulator 22 is connected to burner unit 26 shown in FIG. 2.

The burner unit includes an upwardly concave, disk-shaped member 30 shown in FIG. 2. The disk-shaped member has a bottom 32 provided with a protrusion 34 extending downwardly therefrom. The member is formed from sheet metal, stainless steel in this embodiment.

The burner unit also includes a manifold 40 which is a hollow body made of sheet metal, again preferably stainless steel, in this example. The manifold has a top half 42 shown in better detail in FIG. 5a–5d. The manifold also has a bottom half of 44 shown in better detail in FIG. 4a–4d.

There is a circular opening 48 in the top half located in a recess 50. The bottom half 44 is connected to the top half by means of seams extending about the periphery of both halves.

The bottom half has a mount 52 formed by a raised section of the bottom thereof aligned with the opening 48 of the top half.

There is a semi-circular channel 60 extending radially outwards on the top half 42 and a complementary semi-circular recess 62 on the bottom half 44. When the two halves are connected together, these form a conduit 70 for gas. The conduit has an outer end 72 which serves as a connector for connecting the burner to regulator 22. This is located radially outwards from member 30. There is an opening 76 about the gas conduit which admits air into the conduit 70. In this example there is a similar opening 77 on the opposite side of the gas conduit from opening 76.

As seen best in FIG. 2, the member 30 is connected to the manifold within the opening 48. There is a circular gap 80 extending about the member between the member and the manifold. This allows an air/gas mixture to pass between the manifold and the disk-shaped member prior to combustion.

The protrusion 34 of the disk-shaped member contacts the mount 52 and is connected thereto by a male threaded collar 82 on the protrusion engaging female threaded collar 84 on the mount as seen in FIG. 6. There is a drainage passageway 86 provided through the center of the collars.

There is a plurality of dimples 90 in the member 30 just above the protrusion 32. These form a series of downwardly directed projections 92 which contact the manifold about the opening 48. These projections interrupt the circular gap 80 slightly, but stabilize the member 30 on the manifold.

The combination barbecue and stove 10 and the burner unit 26 operate in a conventional manner. A gas cylinder, typically containing propane, is connected to regulator 22 in the conventional manner. The gas flows through the regulator into the conduit 70 of the manifold. Air is introduced through the openings 76 and 77. The air/gas mixture flows through the manifold and upwardly through the circular gap 80 where it is ignited. The circular flame extending about the burner unit is blue because proper combustion can be assured by introducing the air at openings 76 and 77 instead of introducing the combustion air adjacent the disk-shaped member 30.

When the foods begin to cook, they typically drip fluids, particularly fat. However these do not accumulate unduly in the member 30 because of drainage passageway 86 which allows the fluids to drain through the manifold to a suitable container (not shown).

FIG. 2a shows a variation of the invention where disk-shaped member 30 is replaced with a larger member 30.1 for barbecuing. Otherwise the remaining parts are the same as in FIG. 2 with the additional designation ".1". The members 30 and 30.1 can be interchanged by unscrewing the collar 82 from collar 84, removing the disk-shaped member and replacing the alternative one.

It will be understood by someone skilled in the art that some of the details provided above are by way of example only and are not intended to limit the scope of the invention as set out in the following claims.

What is claimed is:

1. A burner unit for a gas cooking apparatus, the unit comprising:

an upwardly concave, disk-shaped member having a bottom and a central protrusion on the bottom; and a manifold having a top with a circular opening and an interior mounting surface within the opening, the disk-shaped member being connected to the manifold within the opening, the protrusion of the disk-shaped member being against the mounting surface of the manifold, a circular gap extending about the disk-shaped member between the member and the manifold, the manifold having a gas connection located radially outwards from the disk-shaped member, and an opening for air adjacent the connection, whereby air mixes with gas entering the manifold through the opening and an air/gas mixture passes through the gap between the manifold and the disk-shaped member.

2. A burner unit as claimed in claim 1, wherein the disk-shaped member is of sheet metal and the manifold is a hollow, sheet metal body.

3. A burner unit as claimed in claim 1, having a drainage passageway extending through the disk-shaped member and the manifold.

4. A burner unit as claimed in claim 3, wherein the disk-shaped member has a center, the drainage passageway extending through the center of the disk-shaped member.

5. A burner unit as claimed in claim 1, wherein the manifold includes a hollow conduit extending radially outwards from the disk-shaped member, the conduit having an outer end, the connection being at the outer end of the conduit.

6. A gas cooking apparatus, comprising:

a hollow body having a lid; and a burner unit within the hollow body, the unit including an upwardly concave, disk-shaped member having a center, a bottom and a central protrusion in the bottom, and a manifold having a top with a circular opening and an interior mounting surface within the opening, the disk-shaped member being connected to the manifold within the opening, the protrusion of the disk-shaped member being against the mounting surface, a circular gap extending about the disk-shaped member between the member and the manifold, a drainage passageway extending through the disk-shaped member and the manifold adjacent to the center of the disk-shaped member, the manifold having a gas connection located radially outwards from the disk-shaped member and an opening for air adjacent the connection, whereby air mixes with gas entering the manifold through the connection and an air/gas mixture passes through the gap between the manifold and the disk-shaped member.

7. A burner unit for a gas cooking apparatus, the unit comprising:

an upwardly concave, disk-shaped member having a center, a bottom and a drainage passageway extending through the center; and a manifold having a top with a circular opening, the disk-shaped member being connected to the manifold within the opening by a fastener at the center of the disk-shaped member, a circular gap extending about the disk-shaped member between the member and the manifold, the manifold having a drainage passageway aligned with the passageway in the disk-shaped member, the passageway extending through the fastener, and a gas connection located radially outwards from the disk-shaped member, and an opening for air adjacent the connection, whereby air mixes with gas entering the manifold through the opening and an air/gas mixture passes through the gap between the manifold and the disk-shaped member.

8. A burner unit as claimed in claimed 7, wherein the fastener is a pair of complementary threaded collars.

9. A burner unit for a gas cooking apparatus, the unit comprising:

an upwardly concave, disk-shaped member having a bottom, a central protrusion on the bottom and a plurality of projections extending about the protrusion; and a manifold having a top with a circular opening and an interior mounting surface within the opening, the protrusion on the disk-shaped member being against the mounting surface, the projections of the disk-shaped member contacting the manifold about the opening, the disk-shaped member being connected to the manifold within the opening, a circular gap extending about the disk-shaped member between the member and the manifold, the manifold having a gas connection located radially outwards from the disk-shaped member, and an opening for air adjacent the connection, whereby air mixes with gas entering the manifold through the opening and an air/gas mixture passes through the gap between the manifold and the disk-shaped member.

* * * * *